(No Model.)

H. REINHOLD.
WIRE MATTRESS.

No. 562,323. Patented June 16, 1896.

Witnesses:
R. Kraemer
C. Schmidlein

Inventor:
Hermann Reinhold
by R. Haddan
his Attorney

UNITED STATES PATENT OFFICE.

HERMANN REINHOLD, OF BERLIN, GERMANY.

WIRE MATTRESS.

SPECIFICATION forming part of Letters Patent No. 562,323, dated June 16, 1896.

Application filed December 27, 1894. Serial No. 533,141. (No model.)

*To all whom it may concern:*

Be it known that I, HERMANN REINHOLD, a subject of the Emperor of Germany, residing at Berlin, Germany, have invented certain new and useful Improvements in Wire Mattresses, of which the following is a specification, reference being had therein to the accompanying drawings.

Wire mattresses have been hitherto made according to the principle that the bed-surfaces are formed of wires engaging with one another, whether these wires have the form of spirals or consist of angular wires provided with V-shaped or other hooks supported by one another or with hooks and eyes.

In stretched position and especially when using such wire mattresses, the wires and the hooks and eyes will grind one upon the other at the points of contact whereby considerable friction is produced which causes them to become quickly worn and also occasions disagreeable noise.

The object of the present improvements is to obviate the above-mentioned inconveniences, and I attain the said object by the means illustrated in the accompanying sheet of drawings, in which—

Figure 1:
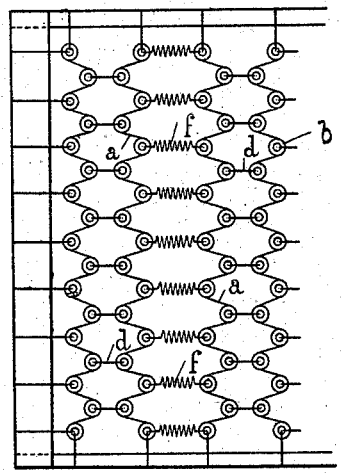
Figure 2:
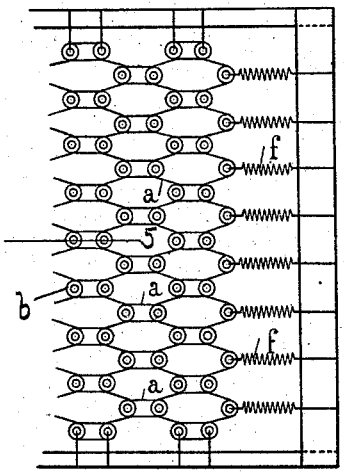
Figures 3, 4, 5:
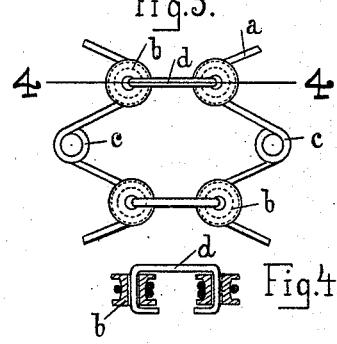
Figure 11:
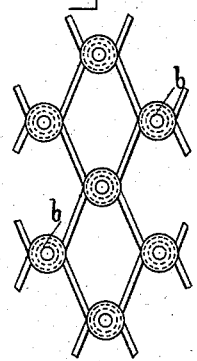

Figures 1 and 2 are part plan views of the improved mattress; Fig. 3, a detail view, on a larger scale, of part of Fig. 1; Fig. 4, a sectional view on line 4 4 of Fig. 3; Fig. 5, a sectional view, on a larger scale, on line 5 5 of Fig. 2. Figs. 6 to 11 are detail views of modifications.

In a suitable frame provided at the head or foot end with springs $f$ of any form is put a net consisting of wires $a$. These wires $a$ are turned around small and alternately-arranged pulleys $b$, made of any suitable material, so that the loops or eyes $c$, formed in the wires by being turned around the said pulleys, are protected from being drawn tight. The same effect will be obtained by first forming the loops $c$ and afterward putting the pulleys $b$ into said loops, but care must be taken that the pulleys fulfil their main purpose above explained.

The wires $a$, passing along nearly the whole length of the frame, are arranged in such a manner that the loops $c$ or the pulleys $b$ are opposite to one another. By connecting these pulleys which are opposite to each other by means of a suitable double hook $d$, and by placing the curved studs of the latter into the central perforations of the pulleys, a net is formed consisting of a plurality of polygons, Figs. 1 and 3.

Figure 6:
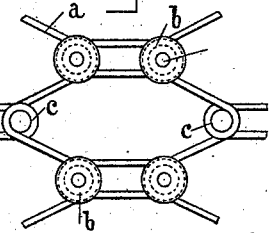
Figure 8:
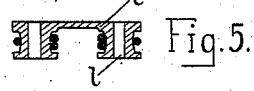

The double hooks may be dispensed with and replaced, as shown in Fig. 6, by suitable wires, which may form a part of the network or special connecting-links.

A wire mattress corresponding to the present invention may also be produced by connecting the loops $c$ of one wire $a$ with the respective loops $c$ of the other wire $a$ directly by means of common pulleys $b$.

Instead of pulleys $b$ in combination with double hooks, as shown in Fig. 4, a solid connecting-link $e$, Fig. 5, may be used. These connecting-links $e$ have pulley-shaped ends provided with orifices $l$, in which the springs $f$ may be engaged at those points where it is necessary to attach the springs $f$.

Figures 7, 9:
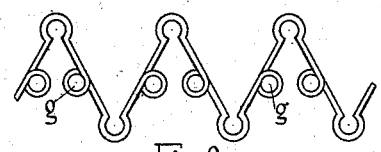
Figure 10:
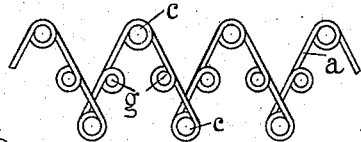

Besides the loops $c$ the wires $a$ of Figs. 7 and 10 show additional loops $g$ without pulleys $b$. These loops $g$ are for the purpose of forming a substitute for the springs $f$ and to increase the spring action of the net itself.

When using a wire mattress of the present structure, the wire net will sag, whereby the springs $f$, arranged at the head or foot end of the frame, Fig. 2, or at other points of the wire net, Fig. 1, are stretched or extended. In consequence of this stretching or extending of the springs the several polygons of the wire net are displaced according to the weight resting upon the wire net and to the drawing effects of said weight. Any noise made by the wires is avoided, as there is no frictional movement between the wires running over or around the pulleys, since the wires do not slide or grind on the pulleys but move or oscillate about their tangential contacts.

Having fully described my invention, what I desire to claim and secure by Letters Patent is—

In a wire mattress the combination of through-wires $a$ having loops $c$ with guide-pulleys $b$ inserted in the said loops, connecting-links adapted to connect and to guide the pulleys $b$, the through-wires $a$ having the additional loops $g$ made therein, substantially as set forth.

In testimony whereof I have signed my signature in presence of two witnesses.

HERMANN REINHOLD.

Witnesses:
CHAS. KRUGER,
WM. HAUPT.